(12) United States Patent
Tanno

(10) Patent No.: US 7,503,364 B2
(45) Date of Patent: Mar. 17, 2009

(54) PNEUMATIC TIRE WITH SHEET-LIKE AUXILIARY FILLER

(75) Inventor: Atsushi Tanno, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 427 days.

(21) Appl. No.: 10/556,788

(22) PCT Filed: Jun. 16, 2004

(86) PCT No.: PCT/JP2004/008426

§ 371 (c)(1),
(2), (4) Date: Nov. 15, 2005

(87) PCT Pub. No.: WO2004/113100

PCT Pub. Date: Dec. 29, 2004

(65) Prior Publication Data

US 2006/0207703 A1    Sep. 21, 2006

(30) Foreign Application Priority Data

Jun. 17, 2003    (JP) ............................. 2003-171970

(51) Int. Cl.
*B60C 13/00*    (2006.01)
*B60C 15/00*    (2006.01)
*B60C 15/06*    (2006.01)

(52) U.S. Cl. .................. 152/541; 152/543; 152/546; 152/547; 152/555

(58) Field of Classification Search ................ 152/458, 152/541–543, 546, 547, 549, 555
See application file for complete search history.

(56) References Cited

U.S. PATENT DOCUMENTS

| 2,063,105 | A | * | 12/1936 | King .......................... 152/542 |
| 2,947,341 | A | * | 8/1960 | Hershey ..................... 152/543 |
| 2,971,553 | A | * | 2/1961 | Woodall ..................... 152/541 |
| 3,406,733 | A | * | 10/1968 | Boileau ...................... 152/542 |
| 4,744,400 | A | * | 5/1988 | Sekoguchi .................. 152/546 |
| 5,023,292 | A | * | 6/1991 | Hong et al. ............. 152/547 X |
| 5,117,888 | A | * | 6/1992 | Shimizu ................. 152/555 X |
| 5,482,102 | A | * | 1/1996 | Suzuki ................... 152/555 X |
| 6,273,162 | B1 | * | 8/2001 | Ohara et al. ............ 152/546 X |
| 2001/0050134 | A1 | * | 12/2001 | Iizuka | |
| 2001/0051685 | A1 | * | 12/2001 | Obrecht et al. | |
| 2002/0170642 | A1 | * | 11/2002 | Westermann et al. | |

FOREIGN PATENT DOCUMENTS

EP    0 483 710 A1 * 5/1992 ................ 152/555

(Continued)

OTHER PUBLICATIONS

International Search Report, Oct. 26, 2004.

*Primary Examiner*—Adrienne C Johnstone
(74) *Attorney, Agent, or Firm*—Greer, Burns & Crain, Ltd.

(57) ABSTRACT

A pneumatic tire whose lateral rigidity is efficiently increased and that enables further improvement of driving stability. The pneumatic tire has bead fillers on the outer peripheral side of bead cores. Sheet-like auxiliary fillers are arranged on both sides of a bead filler, so that not less than ⅔ in the height direction of the bead filler is sandwiched by the auxiliary fillers.

6 Claims, 3 Drawing Sheets

FOREIGN PATENT DOCUMENTS

| | | |
|---|---|---|
| JP | 03-268932 | 11/1991 |
| JP | 09-183304 | 7/1997 |
| JP | 09-302146 | 11/1997 |
| JP | 11-028916 | 2/1999 |
| JP | 2002205515 A * | 7/2002 |
| JP | 2002254910 A * | 9/2002 |
| WO | WO-01/39964 A1 * | 6/2001 |
| WO | WO-02/10271 A2 * | 2/2002 |

* cited by examiner

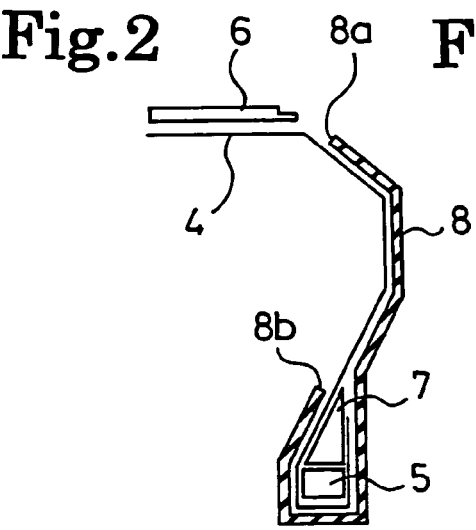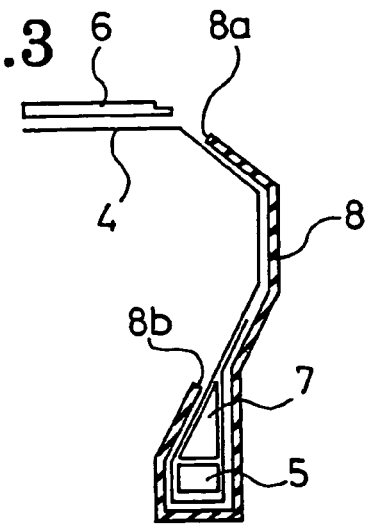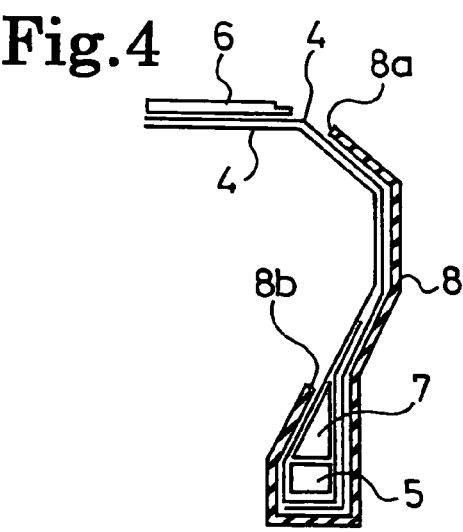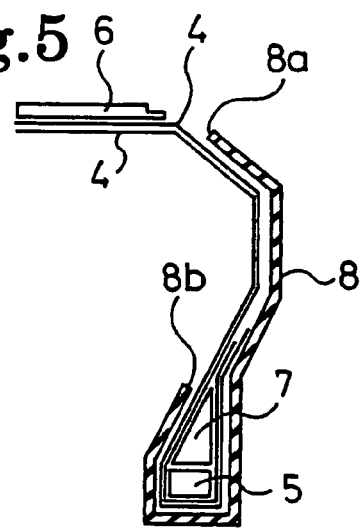

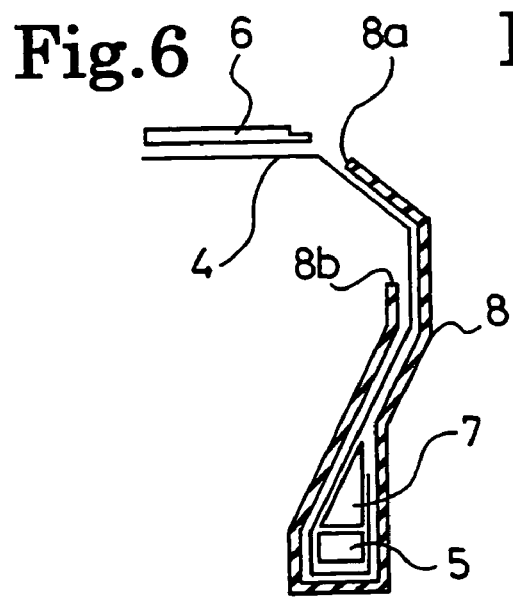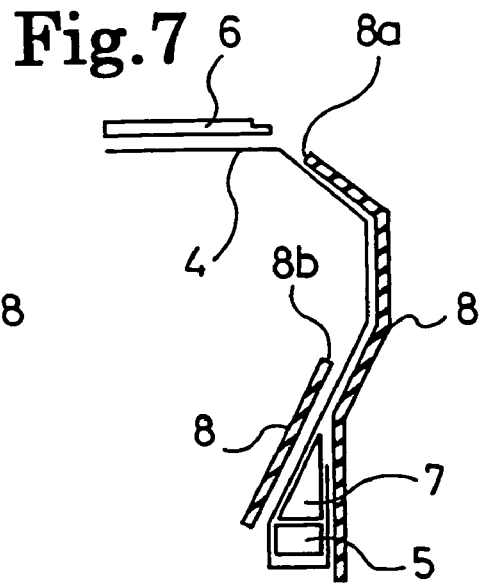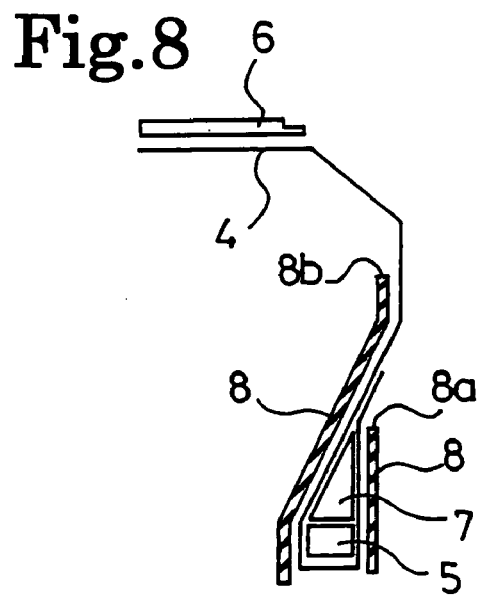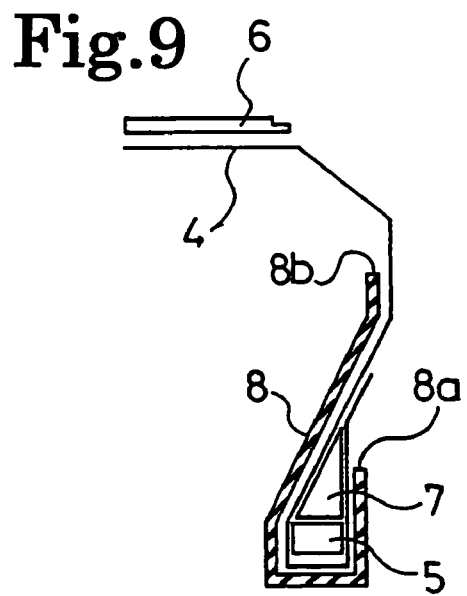

PNEUMATIC TIRE WITH SHEET-LIKE AUXILIARY FILLER

TECHNICAL FIELD

The present invention relates to a pneumatic tire provided with a bead filler on the outer periphery of a bead core. More specifically, the present invention relates to a pneumatic tire whose lateral stiffness is efficiently increased so that its driving stability can be improved.

BACKGROUND ART

In a pneumatic tire, what is performed in order to secure driving stability is to bury therein a bead filler extending from a bead portion to a sidewall portion, the bead filler being formed of a rubber composition having a high degree of hardness. Furthermore, there has been proposed an approach to improve a variety of tire performances by devising cross-sectional shapes of the bead filler.

For example, there has been proposed an approach where driving stability and riding comfort are improved without affecting road noise and rolling resistance in a manner that: the bead filler is composed of a wide-width part (a thicker part in a cross section taken along a meridian of the tire) at the side of its inner periphery and a narrow-width part (a thinner part in a cross section taken along a meridian of the tire) at the side of its outer periphery; and the sheet-like narrow-width part is allowed to extend beyond a widest-width position of the tire to a location relatively outward in a radial direction of the tire (refer to Patent Document 1, for example).

However, in such a reinforcement structure of the bead portion as described above, although peripheral stiffness has been considerably increased owing to the sheet-like bead filler extending outward beyond a widest-width position of the tire in a radial direction of the tire, an effect of improving driving stability has not necessarily been sufficient because an effect of increasing a spring constant in a lateral direction of the tire has not been sufficient.

Patent Document 1: Japanese patent application Kokai publication No. Hei11-28916

DISCLOSURE OF THE INVENTION

An object of the present invention is to provide a pneumatic tire whose lateral stiffness is efficiently increased and whose driving stability can be further improved thereby.

A pneumatic tire according to the present invention for achieving the above object is a pneumatic tire where a bead filler is arranged on the outer periphery of a bead core, the pneumatic tire being characterized in that: a sheet-like auxiliary filler is arranged on both sides of the bead filler; and at least two thirds of the bead filler in a height direction thereof is wrapped around by the sheet-like auxiliary filler.

By thus arranging the sheet-like auxiliary filler on the both sides of the bead filler so that the bead filler is wrapped around by the auxiliary filler, stiffness of a circumferential direction of the tire is increased, and in addition, a spring constant of a lateral direction of the tire is also considerably increased. In particular, by allowing the tire to have a structure where at least two thirds of the bead filler is wrapped around by the auxiliary filler, the above effect becomes more remarkable. In that way, lateral stiffness of the tire is effectively increased, and hence driving stability can be enhanced.

Incidentally, it is desirable that one upper end of the auxiliary filler be extended outward from the widest-width position of the tire in a radial direction thereof, and that the other upper end of the auxiliary filler be arranged inward from the widest-width position of the tire in a radial direction of the tire. This is because, if both of the upper ends are extended outward from the widest-width position of the tire in a radial direction of the tire, the stiffness becomes excessive.

In the present invention, in order to enhance driving stability without affecting durability and rolling resistance when the auxiliary filler is added, it is desirable that a rubber composition forming the auxiliary filler have a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test.

Additionally, it is desirable that the auxiliary filler be arranged continuously along a carcass layer in a manner that it straddles the both sides of the bead filler. In the present invention, it is required to arrange the auxiliary filler on the both sides of the bead filler. In this regard, if the auxiliary filler has been attached to a predetermined position of the carcass layer in advance in a process of forming a tire, the auxiliary filler can be turned up at the same time in a process of turning up the carcass layer around the bead core. In this case, production efficiency of the tire becomes excellent.

BRIEF DESCRIPTION OF THE DRAWINGS

FIG. 2 is a half cross-sectional view schematically showing a pneumatic tire according to another embodiment of the invention.

FIG. 3 is a half cross-sectional view schematically showing a pneumatic tire according to still another embodiment of the invention.

FIG. 4 is a half cross-sectional view schematically showing a pneumatic tire according to still another embodiment of the invention.

FIG. 5 is a half cross-sectional view schematically showing a pneumatic tire according to still another embodiment of the invention.

FIG. 6 is a half cross-sectional view schematically showing a pneumatic tire according to another embodiment of the invention.

FIG. 7 is a half cross-sectional view schematically showing a pneumatic tire according to still another embodiment of the invention.

FIG. 8 is a half cross-sectional view schematically showing a pneumatic tire according to still another embodiment of the invention.

FIG. 9 is a half cross-sectional view schematically showing a pneumatic tire according to still another embodiment of the invention.

BEST MODES FOR CARRYING OUT THE INVENTION

Figure 1:
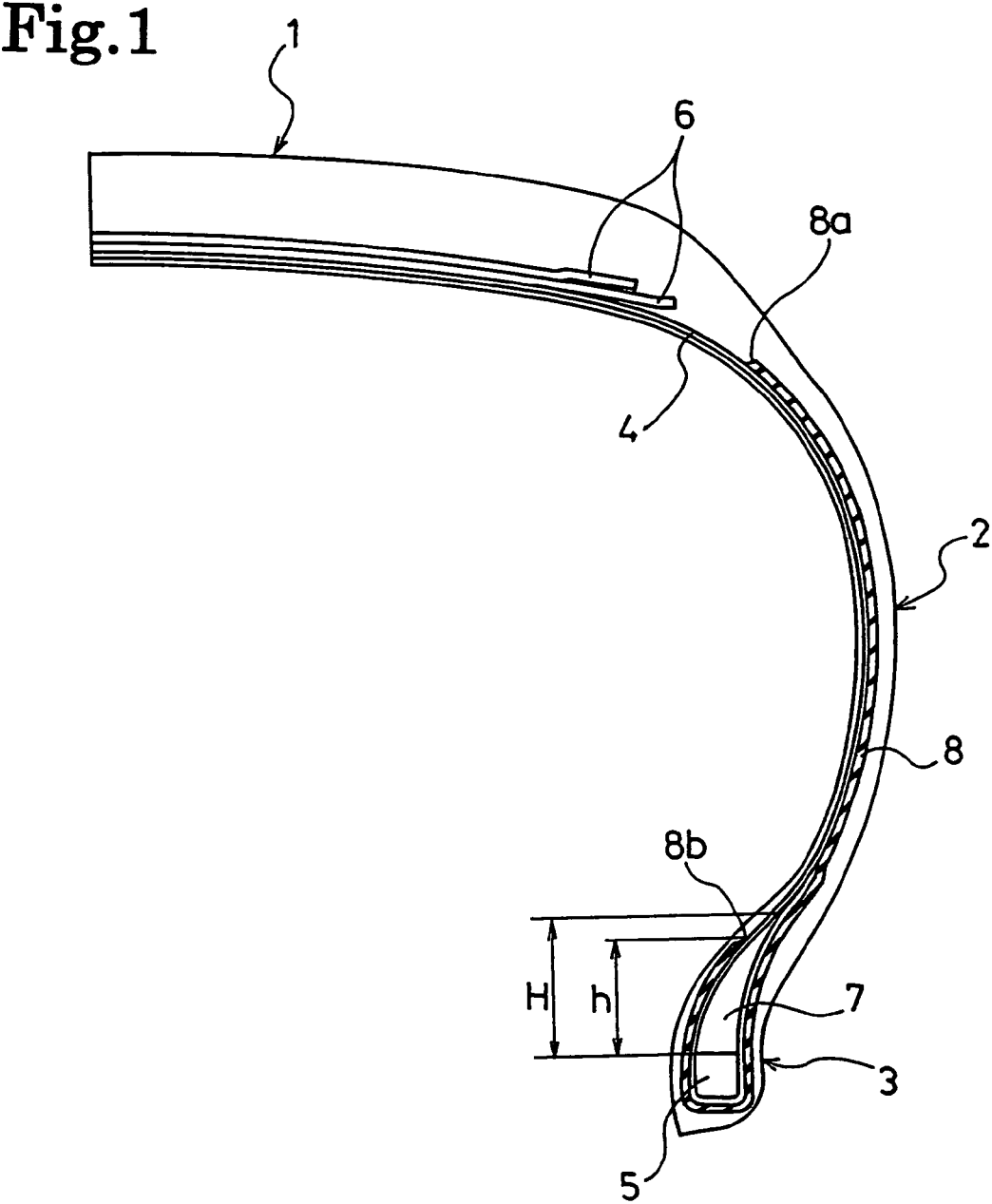
FIG. 1 is a half cross-sectional view showing a pneumatic tire according to an embodiment of the present invention.

Hereinafter, a detailed description will be given of a configuration of the present invention with reference to the attached drawings.

FIG. 1 shows a pneumatic tire according to an embodiment of the present invention. In FIG. 1, reference numerals 1, 2, and 3 respectively denote a tread portion, a sidewall portion, and a bead portion. A carcass layer 4 is mounted between a pair of the left and right bead portions 3 and 3, and has an end part folded back from the inside to the outside of the tire around a bead core 5. A plurality of belt layers 6, 6 are buried on the outer periphery of the carcass layer 4. These belt layers 6, 6 are arranged in order that cords can tilt to a circumferential direction of the tire and that the cords can cross one another between the layers. On the outer periphery of each of the bead cores 5, a bead filler 7, formed of a rubber composition having a high degree of hardness, is buried. The bead filler 7 has a shape which gradually becomes thinner in a region more outward in a radial direction of the tire. Thus, a cross-sectional shape of the bead filler 7 is substantially triangular.

On both sides of the bead filler 7, a sheet-like auxiliary filler 8 is arranged. This auxiliary filler 8 is folded back, together with the carcass layer 4, around the bead core 5, and wraps around the bead core 5 and the bead filler 7 as one through the carcass layer 4. While an upper end 8a in a relatively outer location in the width-wise direction of the tire extends outward from a widest-width position of the tire in a radial direction of the tire, an upper end 8b in a relatively inner location in the width-wise direction of the tire is located inward from a widest-width position of the tire in a radial direction of the tire. As a result, the auxiliary filler 8 wraps around at least two thirds of the bead filler 7 in a height direction of the bead filler. That is, given that a height of the head filler 7 is denoted by H and that a height of the portion wrapped around by the auxiliary filler 8 is denoted by h, the auxiliary filler 8 is arranged in a state satisfying $h/H \geq 2/3$. If the height h of the portion wrapped around by the auxiliary filler 8 is less than 2/3 of the height H of the bead filler 7, an effect of increasing lateral stiffness of the tire becomes insufficient.

It is preferable that a rubber composition forming the auxiliary filler 8 have a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test.

For the rubber composition forming the auxiliary filler 8, it is technically difficult to make its loss tangent less than 0.01 when measured at a temperature of 60° C., and on the other hand, rolling resistance is deteriorated if the loss tangent exceeds 0.25. A more desirable range of the loss tangent is 0.07 to 0.25. Note that the loss tangent (tan δ) here is the one measured by using a viscoelastic spectrometer (manufactured by Toyo Seiki Seisaku-sho, Ltd.), with the conditions of a frequency of 20 Hz, an initial distortion of 10%, and a dynamic distortion of plus or minus 2%.

Additionally, the rubber composition forming the auxiliary filler 8 is made to have a JIS-A hardness of 70 to 95 when measured at a temperature of 23° C. This is because: if the JIS-A hardness is less than 70, an effect of improving driving stability becomes insufficient; and on the other hand, if the JIS-A hardness exceeds 95, riding comfort and durability are deteriorated.

Moreover, the rubber composition forming the auxiliary filler 8 is made to have a breaking elongation not less than 200% when measured at a temperature of 23° C. in a tensile test. This is because if the breaking elongation is less than 200%, durability of the tire becomes insufficient. Although it is not required to particularly limit an upper limit of the breaking elongation, the upper limit is about 350% in reality. Note that the breaking elongation here is the one measured in compliance with JIS K6251.

What can be used as a rubber composition exhibiting the above physical properties is one formed in a manner that 20 to 120 weight parts of silica and 0 to 60 weight parts of carbon black are mixed with 100 weight parts of rubber. In a case where a mixed amount of silica is out of the above range, it is difficult to obtain the above physical properties. In a case where carbon black is additionally mixed, it becomes difficult to obtain the above physical properties if a mixed amount of carbon black exceeds 60 weight parts.

As silica, for example, dry-method white carbon, wet-method white carbon, colloidal silica, and precipitated silica can be cited. These kinds of silica may be used by one or in combination of two or more.

As base rubber, for example, natural rubber (NR) and styrene-butadiene copolymer rubber (SBR) can be cited. These kinds of rubber may be used by one or in combination of two or more. Additionally, to the rubber composition thus obtained, in addition to silica and carbon black, a compounding agent used regularly may be added. As compounding agents, for example, process oil, vulcanizer, vulcanization accelerator, antioxidant, plasticizer can be cited.

The pneumatic tire configured as above includes the sheet-like auxiliary filler 8 arranged on the both sides of the bead filler 7, so that the auxiliary filler 8 wraps around the bead filler 7. Therefore, the lateral stiffness of the tire is efficiently increased and hence driving stability is considerably enhanced as compared with a conventional tire. Moreover, according to the above reinforcement structure, there is also an advantage that rim demounting resistance is increased.

In addition, since the auxiliary filler 8 is arranged continuously along the carcass layer 4 in a manner that it straddles the both sides of the bead filler 7, production efficiency is made higher. That is, by having the auxiliary filler 8 attached in advance to the carcass layer 4 in a process of forming a tire, and then by turning up the auxiliary filler 8, together with the carcass layer 4, around the bead core 5, it is not required to add a further process.

FIGS. 2 to 9 schematically show pneumatic tires respectively according to other embodiments of the present invention. In FIG. 2, a turned-up portion of a carcass layer 4 has its highest point lower than the peak of the bead filler 7. Alternatively, while FIG. 3 shows a carcass layer 4 having one ply of a turned-up structure, each of FIGS. 4 and 5 shows a carcass layer 4 having two plies. In particular, FIG. 4 shows a ply-lock structure where a turned-up portion of one ply of the carcass layer 4 is covered by the other ply of the carcass layer 4. Even in these cases where structures of the carcass layers are thus different, an effect of improving driving stability can be obtained.

In FIG. 6, upper ends 8a and 8b respectively extend outward from a widest-width position of the tire in a radial direction of the tire. In FIGS. 7 and 8, two sheets of divided pieces constituting the auxiliary filler 8 are arranged in a manner that they are separate from each other. That is, the auxiliary filler 8 may be discontinuously arranged, although it is desirable that the auxiliary filler 8 be continuously arranged along the carcass layer 4 in a manner that it straddles the both sides of the bead filler 7. In particular, in FIG. 8, while an upper end 8a of the auxiliary filler 8 in a relatively outer location in the width-wise direction of the tire is located inward from a widest-width position of the tire in a radial direction of the tire, an upper end 8b of the auxiliary filler 8 in a relatively inner location in the width-wise direction of the tire extends outward from a widest-width position of the tire in a radial direction of the tire.

Furthermore, in FIG. 9, while an upper end 8a of the auxiliary filler 8 in a relatively outer location in the width-wise direction of the tire is located inward from a widest-width position of the tire in a radial direction of the tire, an upper end 8b of the auxiliary filler 8 in a relatively inner location in the width-wise direction of the tire extends outward from a widest-width position of the tire in a radial direction of the tire. As long as the conditions thus defined are satisfied, it is possible to arbitrarily design a structure of the auxiliary filler.

While the detailed descriptions have been given of the preferred embodiments of the present invention hereinabove, it should be understood that various modifications to, substitutions for, and replacements with the preferred embodiment can be carried out as long as the modifications, the substitutions, and the replacements do not depart from the spirit and the scope of the present invention defined by the attached claims.

EXAMPLES

Conventional examples 1 and 2, a comparative example, and examples 1 to 3 were manufactured. These examples respectively correspond to pneumatic tires with a tire size of 205/65R15 which are the same except that different kinds of reinforcement structures were employed in their bead portions. In the conventional example 1, a bead filler was arranged on the outer periphery of a bead core. The conventional example 2 is the one in which an auxiliary filler was added, on one side of the bead filler, to the pneumatic tire of the conventional example 1. The comparative example and the examples 1 to 3 are the ones in each of which an auxiliary filler was added, on the both sides of the bead filler, to the pneumatic tire in the conventional example 1. In each of the comparative example and the examples 1 to 3, while an upper end of the auxiliary filler in a relatively outer location in the width-wise direction of the tire extended outward from a widest-width position of the tire in a radial direction of the tire, an upper end of the auxiliary filler in a relatively inner location in the width-wise direction of the tire was located inward from a widest-width position of the tire in a radial direction of the tire (refer to FIG. 1). Table 1 shows physical properties of rubber compositions forming the auxiliary fillers for the respective examples.

By using these test tires, spring constants and rim demounting resistance were measured by the following manners and the results thereof are also shown in Table 1.

Spring Constant

Each of the test tires was mounted onto a wheel of a rim size of 15×6½ JJ, and its tread portion was fixed in a state where the tire is inflated. Then, displacements respectively in a circumferential direction and an axial direction of the tire were applied to its rim, and reaction forces thereof were measured. A spring constant in the circumferential direction of the tire and a spring constant in the lateral direction of the tire were then found. Results of the assessment are shown in index numbers where each of the spring constants of the conventional example 1 is taken as 100. A higher value of the index number means that a spring constant is larger.

Rim Demounting Resistance

Each of the test tires was mounted onto an wheel of a rim size of 15×6½ JJ, and its bead portion was pushed in toward in an axial direction of the tire, in a state where the tire is inflated. Then, a resistance at the time when rim demounting occurred was measured. Results of the assessment are shown in index numbers where the resistance of the conventional example 1 is taken as 100. A higher value of the index number means that a rim dismounting resistance is larger.

TABLE 1

|  | Conventional example 1 | Conventional example 2 | Comparative example | Example 1 | Example 2 | Example 3 |
| --- | --- | --- | --- | --- | --- | --- |
| Arrangement of auxiliary filler | No filler | One side | Both sides | Both sides | Both sides | Both sides |
| h/H | — | — | 0.5 | 2/3 | 1.5 | 1.5 |
| tan δ | — | 0.22 | 0.19 | 0.19 | 0.22 | 0.19 |
| JIS-A hardness | — | 81 | 85 | 85 | 81 | 85 |
| Breaking elongation (%) | — | 198 | 204 | 204 | 198 | 204 |
| Circumferential spring constant (index number) | 100 | 128 | 127 | 129 | 135 | 137 |
| Lateral spring constant (index number) | 100 | 106 | 105 | 113 | 121 | 123 |
| Rim demounting resistance (index number) | 100 | 102 | 106 | 106 | 106 | 107 |

As apparent from this Table 1, in each of the tires of the examples 1 to 3, the spring constant in the circumferential direction of the tire and the spring constant in the lateral direction of the tire were remarkably increased as compared to those of the conventional example 1. On the other hand, in each of the tires respectively of the conventional example 2 and the comparative example, an increase in the spring constant in the lateral direction of the tire was insufficient.

What is claimed is:

1. A pneumatic tire in which a bead filler is arranged on an outer periphery of a bead core, wherein:
    a sheet-like auxiliary filler, which consists of a rubber composition, is arranged on both sides of the bead filler;
    at least two-thirds of the bead filler in a height direction of the bead filler is wrapped around by the sheet-like auxiliary filler; and
    a carcass layer is disposed with an end part folded back around the bead core so as to pass between the bead filler and the sheet-like auxiliary filler,
    further wherein while an upper end of the auxiliary filler, disposed on an outer side of the carcass layer in a width-wise direction of the tire, is extended radially outward past a widest-width portion of the tire in a radial direction of the tire, the other end of the auxiliary filler, disposed on an inner side of the carcass layer in the width-wise direction of the tire, is arranged radially inward from the widest-width portion of the tire in a radial direction of the tire.

2. The pneumatic tire according to claim 1, wherein:
    the rubber composition forming the auxiliary filler has a loss tangent (tan δ) of 0.01 to 0.25 when measured at a temperature of 60° C., a JIS-A hardness of 70 to 95 when measured at a temperature of 23° C., and a breaking elongation not less than 200% when measured at a temperature of 23° C. in a tensile test.

3. The pneumatic tire according to any one of claims 1 and 2, wherein:
    the auxiliary filler is arranged continuously along the carcass layer in a manner that it straddles the both sides of the bead filler.

4. The pneumatic tire according to claim 1, wherein at least one of the ends of the auxiliary filler extends radially outward of the radially outer portion of the bead filler.

5. The pneumatic tire according to claim 1, wherein the auxiliary filler is arranged continuously between the upper end of the auxiliary filler and the other end of the auxiliary filler.

6. The pneumatic tire according to claim 1, wherein an outer portion of the auxiliary filler, in the width-wise direction of the tire, is separated from an inner portion of the auxiliary filler, in the width-wise direction of the tire.

* * * * *